US011935011B2

(12) United States Patent
West

(10) Patent No.: US 11,935,011 B2
(45) Date of Patent: Mar. 19, 2024

(54) NOTIFICATION SYSTEM

(71) Applicant: Alan West, Camarillo, CA (US)

(72) Inventor: Alan West, Camarillo, CA (US)

(*) Notice: Subject to any disclaimer, the term of this patent is extended or adjusted under 35 U.S.C. 154(b) by 0 days.

(21) Appl. No.: 17/132,883

(22) Filed: Dec. 23, 2020

(65) Prior Publication Data

US 2021/0117924 A1 Apr. 22, 2021

Related U.S. Application Data

(63) Continuation of application No. 16/884,963, filed on May 27, 2020, now Pat. No. 10,984,389, which is a
(Continued)

(51) Int. Cl.
| | |
|---|---|
| *G06Q 10/1091* | (2023.01) |
| *G06K 19/06* | (2006.01) |
| *G06Q 10/02* | (2012.01) |
| *G06Q 20/32* | (2012.01) |
| *G06Q 30/02* | (2023.01) |

(Continued)

(52) U.S. Cl.
CPC ......... *G06Q 10/1091* (2013.01); *G06Q 10/02* (2013.01); *G06Q 20/3274* (2013.01); *G06Q 20/3276* (2013.01); *G06Q 30/0281* (2013.01); *G06Q 50/12* (2013.01); *H04W 4/029* (2018.02); *H04W 4/14* (2013.01); *G06K 19/06037* (2013.01); *H04W 8/24* (2013.01)

(58) Field of Classification Search
CPC ........... G06Q 10/1091; G06Q 20/3276; G06Q 20/3274; G06Q 30/0281; H04W 4/029; H04W 4/14; H04W 8/24; H04W 4/02; G06K 19/06037
See application file for complete search history.

(56) References Cited

U.S. PATENT DOCUMENTS 6,243,574 B1   6/2001  McGregor et al.
2002/0133400 A1*  9/2002  Terry ................. G06Q 30/0225
                                                           705/14.17
(Continued)

FOREIGN PATENT DOCUMENTS

WO    WO01533991 A1 *  7/2001  ............. G06F 17/30

OTHER PUBLICATIONS

E. Toye, R. Sharp, Anil Madhavapeddy and D. Scott, "Using smart phones to access site-specific services," in IEEE Pervasive Computing, vol. 4, No. 2, pp. 60-66, Jan.-Mar. 2005, doi: 10.1109/MPRV.2005.44. (Year: 2005).*

(Continued)

*Primary Examiner* — Crystol Stewart
(74) *Attorney, Agent, or Firm* — Stetina Brunda Garred & Brucker

(57) ABSTRACT

A notification system and method that allows a user to be placed on a waiting list, disclosing only the personal information the user chooses to disclose, and receive updates or other information relating to his status on the waiting list through a personal communication device. A timekeeping system and method generates time in and time out record entries based upon a display code presented the personal communication device. A form data aggregation system and method consolidates inputted information from multiple applications on the personal communication device.

17 Claims, 12 Drawing Sheets

Related U.S. Application Data continuation of application No. 15/355,973, filed on Nov. 18, 2016, now abandoned, and a continuation-in-part of application No. 14/334,557, filed on Jul. 17, 2014, now abandoned.

(60) Provisional application No. 61/847,448, filed on Jul. 17, 2013.

(51) Int. Cl.
*G06Q 50/12* (2012.01)
*H04W 4/029* (2018.01)
*H04W 4/14* (2009.01)
*H04W 8/24* (2009.01)

(56) References Cited

U.S. PATENT DOCUMENTS

| | | | |
|---|---|---|---|
| 2004/0139204 A1 | 7/2004 | Ergezinger et al. | |
| 2005/0080676 A1* | 4/2005 | Lovegreen | G06Q 50/12 705/15 |
| 2006/0091203 A1* | 5/2006 | Bakker | G06Q 30/02 235/381 |
| 2006/0123041 A1 | 6/2006 | Sandrini et al. | |
| 2006/0147005 A1* | 7/2006 | Taub | G07C 11/00 379/114.2 |
| 2008/0032719 A1 | 2/2008 | Rosenberg | |
| 2008/0113677 A1 | 5/2008 | Madnawat | |
| 2011/0012715 A1 | 1/2011 | Eschenauer et al. | |
| 2011/0053618 A1* | 3/2011 | Lin | H04L 51/38 455/466 |
| 2012/0044059 A1 | 2/2012 | Saros et al. | |
| 2013/0219479 A1 | 8/2013 | DeSoto et al. | |
| 2013/0262233 A1* | 10/2013 | Bradley | G06Q 30/0267 705/14.64 |
| 2014/0258127 A1 | 9/2014 | Chava | |
| 2014/0279499 A1* | 9/2014 | Kane | G06Q 20/3274 705/44 |
| 2014/0297556 A1* | 10/2014 | Ryan | G06Q 30/0615 705/346 |
| 2014/0350976 A1* | 11/2014 | Salas Fehlandt | G07C 11/00 705/5 |
| 2014/0359476 A1* | 12/2014 | Wakeford | H04L 67/131 715/748 |
| 2015/0025919 A1 | 1/2015 | West | |
| 2015/0088562 A1* | 3/2015 | Woods | G06Q 50/12 705/5 |
| 2015/0242770 A1* | 8/2015 | Song | G06Q 30/0281 705/7.12 |
| 2015/0334108 A1 | 11/2015 | Khalil et al. | |
| 2016/0117612 A1* | 4/2016 | Hong | G06Q 10/02 705/5 |
| 2018/0376295 A1 | 12/2018 | Huang et al. | |
| 2020/0250737 A1* | 8/2020 | Wallace | H04W 4/02 |

OTHER PUBLICATIONS

G. L. Intal et al., "Restaurant Information System (RIS) with QR Code to Improve Service Operations of Casual Fine Dining Restaurant," 2020 IEEE 7th International Conference on Industrial Engineering and Applications (ICIEA), Bangkok, Thailand, 2020, pp. 1054-1059 (Year: 2020).*

* cited by examiner

NOTIFICATION SYSTEM

CROSS-REFERENCE TO RELATED APPLICATIONS

The present application is a continuation patent application of U.S. patent application Ser. No. 16/884,963 filed on May 27, 2020, which is a continuation patent application of U.S. patent application Ser. No. 15/355,973 filed Nov. 18, 2016 and a continuation-in-part application of U.S. patent application Ser. No. 14/334,557 filed Jul. 17, 2014, which claims the benefit of provisional patent application No. 61/847,448 filed Jul. 17, 2013, the entire contents of each of which are wholly incorporated by reference herein.

STATEMENT RE: FEDERALLY SPONSORED RESEARCH/DEVELOPMENT

Not Applicable

BACKGROUND

1. Technical Field

The present disclosure relates generally to data communications, and more particularly to the deployment of image-based identifiers on mobile devices for user data exchange.

2. Related Art

Due to its portability and continuously expanding feature set, smartphones have a nearly ubiquitous presence in everyday life, and its adoption is now widespread. Fundamentally, the smartphone is a general purpose computer with a data processor that can execute pre-programmed instructions to generate an output based upon or in response to inputs. The primary input and output modality of smartphones is the combined touch screen display, which allows the user to interact directly with the graphical elements displayed in the screen.

The smartphone primarily serves as a communications device, and therefore includes various wireless communications modalities such as a mobile telephone/cellular module for placing and receiving telephone calls and sending and receiving text messages, a WiFi module for establishing short-range local area network data links, and a Bluetooth module for wirelessly connecting personal peripheral devices such as smart watches, headsets, and the like. Using either the cellular network or WiFi, smartphones can connect to the Internet. In addition to websites that may be accessed with web browser applications that are running on the smartphone, specialized mobile device-optimized software applications, also known in the art as "apps," may use the Internet connection to retrieve data from a remote server that can be presented via the app.

These apps run on a mobile operating system or platform such as Apple iOS, Google Android, and Microsoft Windows Mobile, all of which provide a common application programming interface for apps targeted thereto. In addition to the touch screen displays and wireless modules, smartphones include other peripheral devices such as GPS (global positioning system) receivers and cameras, extending the functionality to navigation, video capture, photography, and so on. Furthermore, with the improved data processing capabilities and faster data communication speeds, developers can create apps that go well beyond personal digital assistant (PDA) type functionality such as calendaring, to-do lists, memo creation, and contact management. The smartphone is thus well-suited for automating, streamlining, and otherwise improving various processes encountered throughout work and daily living.

For example, when going to a crowded restaurant, guests without reservations often give their name, the number in their party, and are put on a waiting list. In some cases, the restaurant gives the guest an electronic pager, which goes off when their table is ready, so the guest returns to the hostess stand to be seated. JTech Communications, Long Range Systems, and PagerTec are just a few of the companies offering such pager systems.

Other companies have also offered pager systems that use a guest's cellular phone, allowing the restaurant to send a text to the guest's mobile number. These systems allow the restaurant to obtain personal information and access to the guest's mobile phone for future offers, tracking, or other uses that benefit the restaurant or its marketing partners.

These systems lack the ability for a guest to put himself on the lists of other nearby restaurants or business establishments, to allow the guest to determine whether he would rather dine at an alternative business. In addition, guests may not want to provide their mobile phone number or other personal information to the business or its marketing partners.

The same problems may arise with any waiting list or customer waiting line. For example, hotel guests often wait for hotel rooms to be ready, and may seek to do other things during that wait. Similarly, customers often wait in lines at banks, delis, hair salons, etc. Customers also wait in lines at government agencies, such as the motor vehicle department or embassy offices for visa applications. It would be helpful to these persons to be notified of their waiting list status without physically being in a line or in a specific location, or having to disclose personal information.

While waiting in hospitals, doctors' and dentists' offices, clinics, and other medical facilities, patients are typically asked to fill out a variety of forms for providing medical history, billing/insurance information, etc. Filling out forms is not limited to medical matters; new employees must fill out various forms for the human resources department, new enrollees and parents of enrollees of schools and activities must likewise fill out forms for recordkeeping purposes, and so on. Indeed, forms processing represent a substantial portion of the country's workforce, with medical recordkeeping alone constituting as much as $335 billion. By some estimates, inefficiencies in medical form processing is close to $165 billion, or almost fifty percent being wasted.

Due to the prevalence of forms in the medical field, there has been much movement towards paperless information capture therefor. There are some mobile apps that integrate with medical practice management software and can be downloaded to patients' mobile devices. However, the forms that a typical practice, clinic, or hospital requests that its patients fill out may span multiple areas, not all of which a single practice management solution may be configured to handle. Accordingly, there may be a number of different vendors that specialize in each area, thus resulting in a fractured form processing environment where one set of information is provided in one mobile app, and another set of information is provided in a different mobile app. The patient may therefore need to download multiple apps, and enter in the same information multiple times into different apps.

Tracking time for employment/billing purposes is another potential area of improvement where a smartphone may prove valuable. For as long as employees have been compensated an hourly basis, various systems and devices have been developed to track the hours on the job as accurately as possibly while minimizing inconvenience. A timecard filled out by the employee to record the time in and the time out is one of the earliest methods, but is susceptible to erroneous recordation and possibly fraud. Machines that stamp the timecards can reduce the error in timekeeping, but still vulnerable to fraud, where one employee "clocks in" on behalf of another without that employee being present, and other deceptions that may be counteracted if there is an effective way to ensure that each employee is at a known physical location at the time of clocking in or clocking out. Authentication/validation procedures that rely on biometrics such as fingerprints can reduce fraud incidents, as can devices such as keycards with RFID tags that are tied to specific individuals. However, each of these systems incurs additional costs, and requires significant infrastructure upgrades. It would be beneficial to utilize devices that are typically not shared with others, and are known to be carried by a person on a regular basis, such as smartphones.

For the foregoing reasons there is a need for a new device that will allow guests to put their name on one or more waiting lists without providing any personal information, and be notified of their waiting list status using a personal communication device. There is also a need in the art for a device that will improve medical and other form data input and processing, as well as a device that can better track the working time of employees.

BRIEF SUMMARY

Various embodiments of the present disclosure are directed to a system that would allow users to place themselves on a waiting list and be notified of their status through a communication device such as a smart phone or tablet, without providing the user's cell phone number or other identifying information. Other embodiments are directed to a system that clocks in and clocks out workers through a communication device with the location thereof being verified. Moreover, there are embodiments directed to a system that collects form data from multiple independent applications on the communication device.

One purpose for the present invention is to allow anyone with a smart phone or cell phone, or tablet to be put quickly on a list in the order arrived, and notified when their order or turn is up. A second purpose is to expand the range of notification to a person waiting by utilizing a cell phone. A third purpose is to allow for anonymity when getting put on list. A fourth purpose is to allow the guest to determine how he wants to be notified when it is the guest's turn. A fifth purpose is to allow the user to be put on multiple lists at the same time. A sixth purpose is to facilitate clocking in and clocking out while ensuring the employee is doing so from an expected location. A seventh purpose is reducing inefficiencies with form processing, particularly in the medical field. These purposes are non-exhaustive and exemplary only, and not all embodiments need to fulfill each.

The first problem solved is allowing a person to be put on a list either attended or unattended without getting a ticket or giving out recognizable information. The second problem solved is not having to type personal information into a form to be notified, which takes time. The third problem solved is to allow a guest to give out information quickly if wanted. The fourth problem solved is allowing the guest to be delayed being called or moved in a list if held up for some reason. The fifth problem solved is disconnecting the guest from all lists at one source using one account. The sixth problem to be solved is to electronically provide a user's general information to a third party, regardless of being used for a list. The seventh problem solved is the expediting the clocking in and clocking out of an employee. The eight problem to be solved is using a call back system that is tied to a specific location and the identifier of the phone at such location. A ninth problem solved is the reduced cost to the employer. The tenth problem solved is creating a streamlined process for gathering information. The eleventh problem solved is to facilitate an expedient way to get the forms on to a mobile device of the user to be filled out. Again, these problems solved are non-exhaustive and presented by way of example only. Not all embodiments need solve each of the problems.

These purposes and problems are solved by using (1) the Activator, (2) the Service, and (3) the Logger. The Activator may be comprised of (a) an activator application and (b) a communication device, such as a smart phone, or application and a tablet device, or a display card and cell phone to communicate with the Service or the Logger.

The Service may be connected to a network, such as the Internet, for example, through a cloud-based server that has database account management and a messaging system. The messaging system may be able to send mails, text messages, and/or use push technologies to smart phones or other devices that can notify an application. The system may also use standard phone calls or text messages to non-smart phones.

The Logger may comprise a "smart" device, such as a camera/computer, smart phone, or tablet device. The Logger may be connected to a network, such as the Internet. The logger may have an application that can send information to the Service, by communicating with the server.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

One embodiment of the present application allows a user or customer (user and customer are used interchangeably throughout the application) to go to a busy business establishment that has a waiting line to enter or enjoy the services of the establishment; quickly and anonymously secure a place in the line; and receive notifications regarding his place in line through his personal communication device, while he is free to go and do whatever he wants, within reason, including reserving a place in line of a competing establishment. When notified regarding the status of his place in line, the user may respond to the establishment in a variety of ways, including canceling his place in line. All of this can be done without having to return to any of the establishments and without any of the establishments being able to send unwanted communications to the user by utilizing a Service server that generates and/or collects display codes that are linked to a customer's activator application on the customer's communication device, and can be read or transmitted by an establishment's Logger system.

Figure 1:
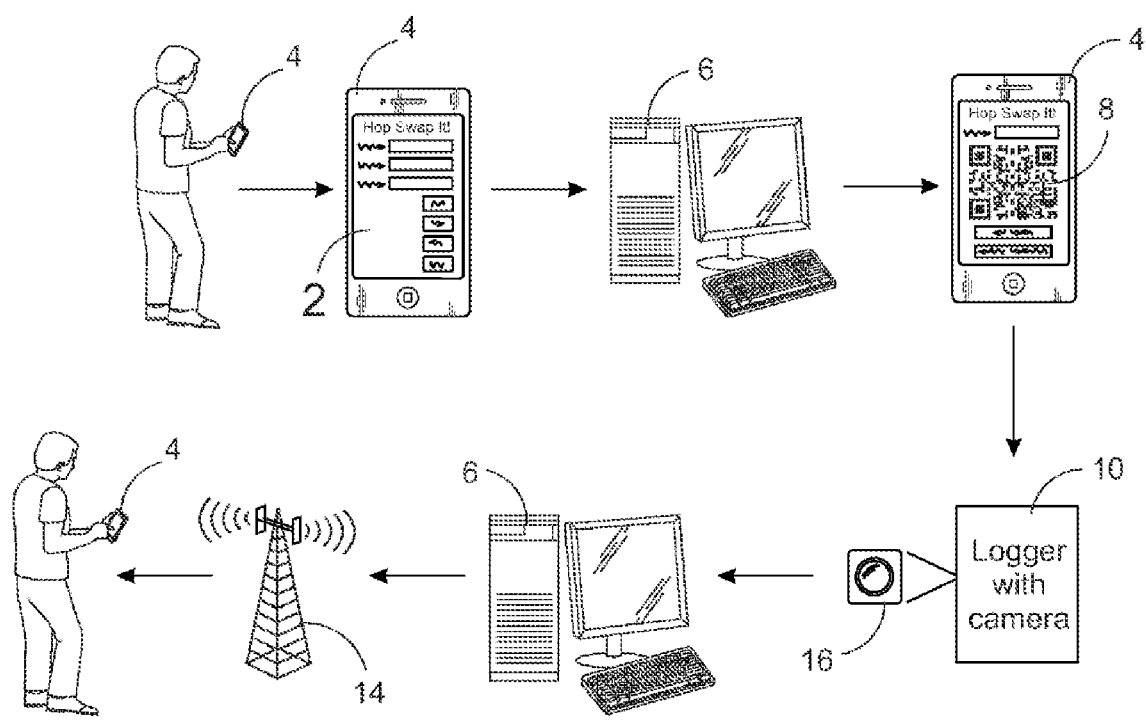
FIG. 1 depicts the hardware and steps to configure and use the Activator application of the present disclosure.

As shown in FIG. 1, the Activator application 2 allows the user to communicate with the Service server 6. The Activator application 2 may be downloaded to a communication device 4, such as a smartphone, tablet, and the like, and the user may enter information required by the application, such as the user's identifying information (optional) and a mode of delivery of how the user wants to be notified, such as by email, text, phone, push notifications through the application, etc., and the relevant information for all the applicable notification modes, such as email address, phone number, etc. The user's information is sent to a Service server 6 and stored in a database to establish the user's account. The user can receive communications from the Service server 6 through the Activator application 2 on the user's communication device 4.

The Service server 6 may be comprised of a network, such as the Internet, connected, for example, to a cloud-based server that has database account management and a messaging system. The messaging system may be able to send emails, text messages, and/or use push technologies to smart phones or other devices that can notify an application. The system may also use standard phone calls or text messages to non-smart phones.

As shown in FIG. 1, once the user information is entered into the Activator application 2 in the communication device 4, it may be sent to the Service server 6, which server may be cloud-based, to set up the user account. The Service server 6 may then generate one or more display codes 8 that are sent back to the Activator application 2, to be displayed on the communication device 4.

Each display code 8 may be associated with different types of information based on the user's account settings. For example, one display code may be for anonymous registration so that identifying information is not transmitted to any business establishments or any other third parties. Another display code 8 may be used to provide general information, such as name, email, phone number. The display codes may be configured to customize the information to be sent by and to the user and how the information is to be sent. For example, the user may want to be able to select different delivery mechanisms at any time, and specific display codes could be generated to select, the delivery method. Therefore, the display code 8 sent back to the user's Activator application 2 determines such settings as how the user will be notified and what information about the user is available. In other words, multiple display codes 8 can be used to encode different privacy settings and notification options.

Once the display code 8 meeting the user's requirements has been selected or generated, the Service server 6 sends the user display code 8 back to the communication device 4. Alternatively, the Activator application 2 may generate the display codes and send the display code information to the Service server 6 to be stored. The set up process is then complete. After the one time set up the user can now use the communication device 4 to be put on lists at an establishment where a Logger 10 is present. A list can be any listing of items or persons whether in any order or randomly distributed on a tangible medium. By way of example only, the list can be established in some kind of chronological order, spatial order, alphabetical order, numerical order, geographical order, or no order at all (i.e. random distribution).

The user display code 8 may be in the form of a matrix barcode, such as QR code, MaxiCode, Aztec Code, Data Matrix, etc., or it could be any suitable code that could be shown on a smart phone display. The display code 8 may also be a photograph or other image that may be encoded with additional information and displayed on the communication device 4. Alternatively, the user display code 8 could be a radio frequency (RF) or infrared (IR) or other transmission, rather than a visual display, typically a transmission method that can be performed by conventional smart phone technologies such as Bluetooth or Wi-Fi. The user display code 8 may be proprietary so that it will restrict the types of data that Logger and/or Service server may receive or send out.

Figure 3:
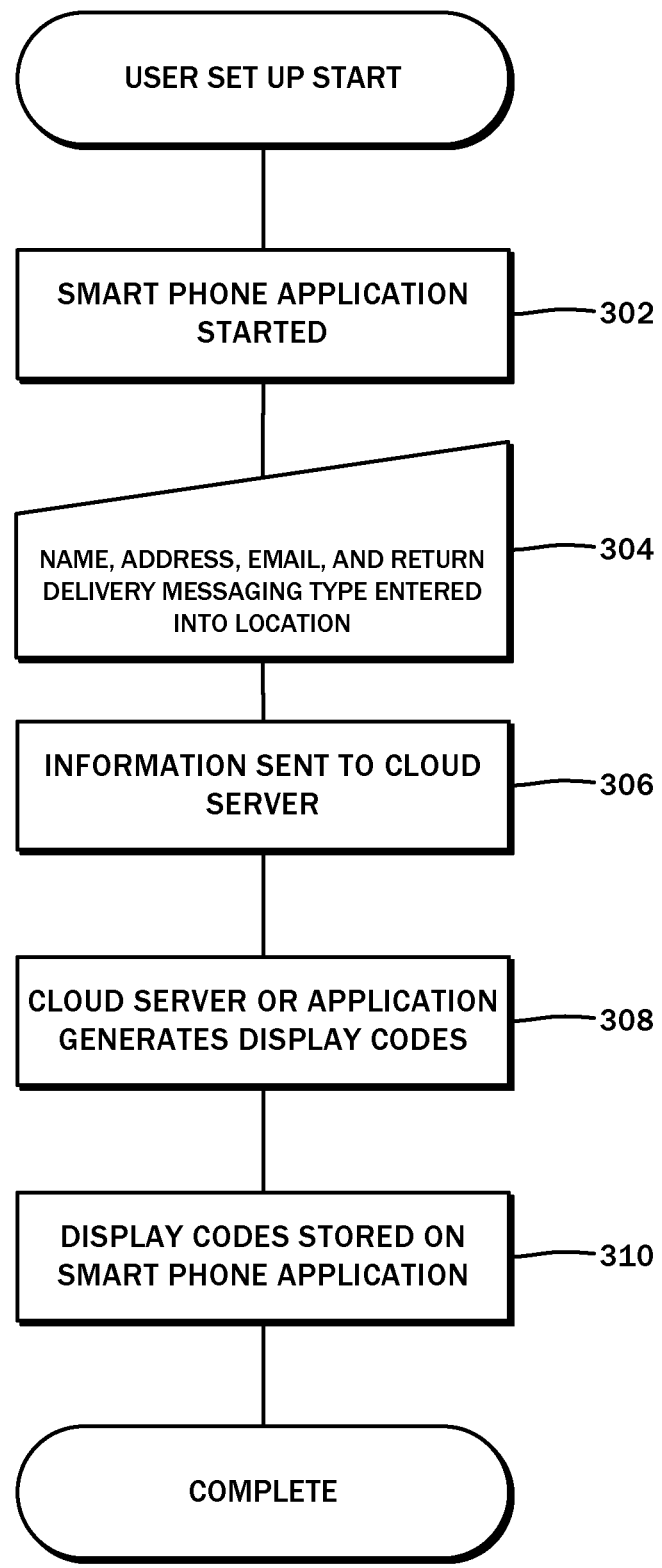
FIG. 3 depicts a flowchart of the user set up steps of an embodiment of the present invention.

FIG. 3 is a flow chart of how the User Set Up process may operate. The activator application is started 302 by the user on his communication device. The user enters his user information 304. The user information may contain contact information as well as information regarding the mode of delivery for communications from the Service server. The user information is sent 306 to the Service server via any mode of communication. Once the Service server receives the information the Service server generates a display code 308 for the user. The Service server may generate the display code and store it in an image repository and sends an account code to the communication device. Using the account code, the communication device is configured to receive the display code from the image repository and the display code becomes active. For example, the display code may be retrieved from the image repository by the communication device, or the Service server can send the display device to the communication device. The display code stored on the communication device for use 310. The display code contains information regarding how the user is to be notified by the Service server.

The Service server 6 may have an application that creates an account for a user, and creates the user display codes 8 and stores the display codes 8 in an image repository. An account code may be sent to the communication device. The account code can be used to retrieve the display code and activate it. In some embodiments, the display code 8 may be sent to the communication device upon creating the display code to be stored by the Activator application 2. The Service server 6 may receive communication from various sources, including the Activator application 2 and Logger 10. In response to such communications, the Service server 6 may send back information needed by those systems, or send information to a different system. These communications may be in various forms, including TCP/IP, e-mail, phone messages, text messages, push notifications, etc.

Figure 7:
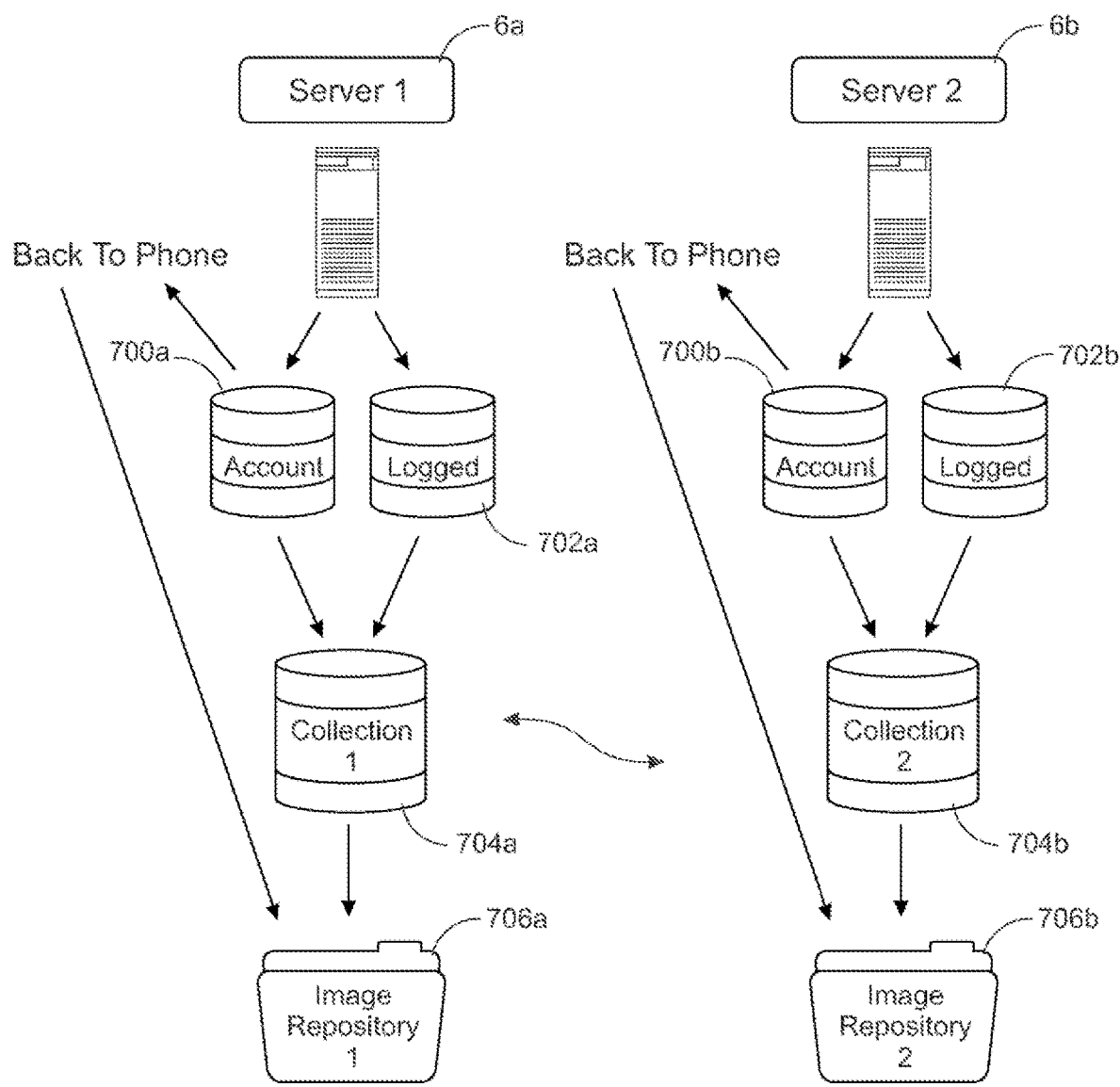
FIG. 7 depicts a flowchart of the functionality of the Service server.

As shown in FIG. 7, in some embodiments, there may be multiple Service servers 6a, 6b. Each Service server 6a, 6b may collect user information and establish user accounts in one database 700a, 700b, and logged information from business establishments in a second database 702a, 702b. A collections database 704a, 704b can be used to reference the first database 700a, 700b or the second database 702a, 702b. All new accounts at the collection 704a, 704b have images made and stored in an image repository 706a, 706b. The activator application may only receive an account name when the account is established. The display codes are retrieved based on the account name.

Any logged communications from the establishment may be processed through the collections database 704a, 704b. The different collections database 704a, 704b are synchronized at pre-established conditions (such as specific time intervals or when information changes) so as to contain the same information across all databases so that any server 6a, 6b.

The participating business establishments may have a Logger 10. The Logger 10 may comprise a "smart" device or a communication device, such as a camera/computer, smart phone, tablet device, or embedded hardware device comprising a CPU with a reader 16, such as a camera, scanner, and the like, and/or radio frequency transmitter/receiver that is capable of reading the display code 8 and communicating with the Service server 6 regarding the status of the user's wait time, among other information. The Logger 10 may also comprise a display screen to display the users on the list. In some embodiments, the display screen may be a touch screen so that signals pertaining to a particular user or display code can be sent to the Service server 6. In some embodiments, other input devices, such as a mouse or keyboard can be used to check and send information from the Logger 10. The Logger 10 may be connected a network, such as the Internet. The Logger 10 may have an application that can send information to the Service server 6 by communicating with the server.

The Logger 10 may be located at a business, such as a restaurant hostess stand. The Logger 10 may be attended, or unattended for user self-service if desired. As shown in FIG. 1, the Logger 10 may be in communication with the Service server 6, or another server or a system of servers. In a typical embodiment, the Logger 10 would have a reader 16 that is capable of reading or receiving the display code 8 on the user's communication device 4. So the reader 16 may be a camera, a scanner, and the like, for capturing the display code 8 displayed on the user's communication device 4, or an antenna for receiving RF transmissions, or an IR receptor, or any other suitable communication device. The logger 10 may also have additional input capability to attach information to the display code 8, such as party size, indoor/outdoor or other preferred seating, smoking/non/smoking, etc. Alternatively, the logger 10 may separately transmit this additional information with some identifier that links it to the display code 8, rather than attaching it to the display code 8. Once the display code 8 is captured by the reader 16, the display code 8 and any additional information may be entered into a list maintained by the establishment, and specifically the logger 10. The Logger 10 then may communicate the display code 8, or an equivalent thereof, and information related to the display code 8 (such as the status of the wait time) to a Service server 6 or other server, which in turn may communicate with a transmitter 14, which transmits a signal to the user's communication device 4 to be interpreted by the Activator application 2, or perhaps an associated application. The transmitter 14 may be the cellular phone system, which can send phone messages, text messages, or other transmissions. The transmitter 14 may also be a network, such as the Internet, a local RF transmission such as Bluetooth or Wi-Fi, or any other suitable mechanism to transmit signals to the communication device. Where the signal is something other than a typical phone transmission (text, voice message, email, etc.), the Activator application 2 or an associated application receiving the signal from the transmitter may interpret the signal and notify the user by setting off an alert on the user's communication device 4. The user can then be notified of the status or any other communication the establishment intended to send to the user.

Figure 4:
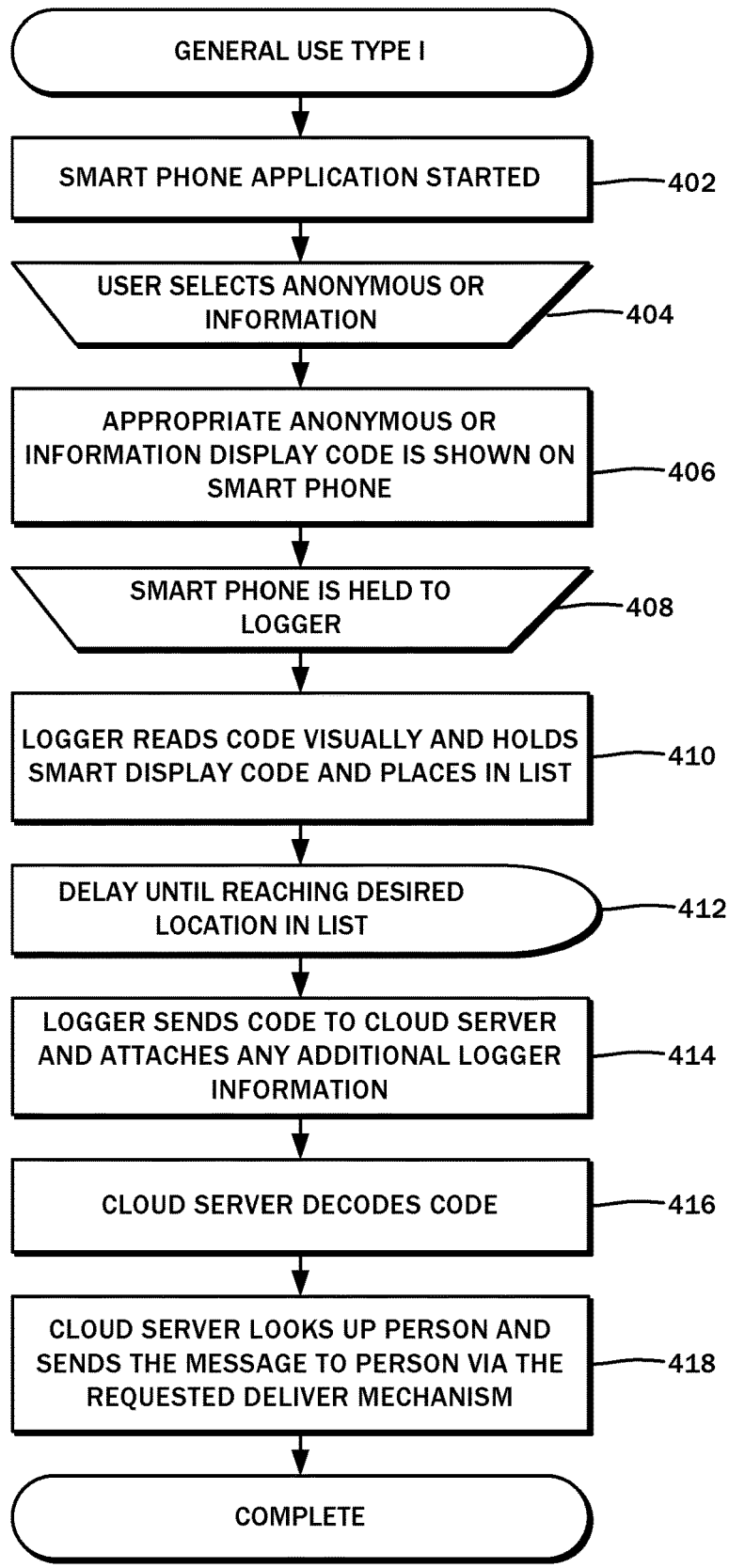
FIG. 4 depicts a flowchart of the steps of an embodiment of the present invention.

An example of general use shown in FIG. 4 is as follows for a restaurant setting. The user enters an establishment, such as a restaurant, where a Logger is present. The user starts the Activator application 402 on the communication device (e.g. a smart phone), and chooses the privacy level of information to be disclosed 404 to the Logger (e.g. either entirely anonymous or full information, or something in between). Optionally, the user may be able to specify the delivery method. Once the user selects the privacy level of information to be disclosed, the desired delivery method, and/or other information, the display code 8 is generated by the Service server and sent back to the user's Activator application to be displayed on the user's communication device 4. Once the display code 8 is displayed on the communication device, the user holds it to the Logger 408 to be read by the Logger. The display code is then read by the Logger, transferred through the Logger and passed to the Logger application, which places the user on a list 410, for example, a list of guests waiting for a table. The logger may also allow the user or the hostess to input other information, such as party size, seating preference, location where the party may be found (e.g. the bar), etc. The user can do whatever he wants or go wherever he wants, within reason, while there is no activity regarding his position on the list. When the user's status on the list changes 412, for example, the moves up in the list or moves to a desired place in the list, is within a certain time frame for being serviced, and the like, the Logger application notifies the Service server of the change in status by sending a signal 414. In some embodiments, the signal 414 may be manually sent, for example, by a hostess by selecting the display code 8 or the user, for example on a display screen. By way of example only, the display codes 8 or the users may be displayed in queue on a touch screen. At any time, the hostess can touch the display code 8 or the user's name and have a signal sent to the Service server 6 accompanied with any additional information by the establishment. The signal is sent, typically through a network, such as the Internet, but any suitable communication method may be used. The signal may contain either information decoded from the display code by the Logger application, or the Logger 10 may simply pass along the undecoded display code, along with the status information, to the Service server. The status information may contain information, such as a message (e.g. "Your table is ready!"), the current wait time, or other information like the restaurant logo, menu, contact information, etc. The Service server interprets or decodes the Logger signal 416 to find the associated user account. Using the messaging service selected by the user for the account, the Service server then sends the status information 418 provided by the Logger using the desired notification set up by the Activator. The notification is sent out by the transmitter to the user's phone, and received by the Activator application. Thus, the process is complete and the user can take the appropriate course of action, such as returning to the hostess station.

The anonymity of the customer is determined by the customer when he establishes his account. This can be changed at any time. If the customer prefers to transmit certain identifying or contact information to the establishment, the activator application allows him to choose the level of information to submit, along with conditions for future contacts from the establishment, such as sending him information on upcoming sales, special deals, new locations, third party offers, etc., which the user can select. Thus, when the Logger 10 reads the display code 8, the Logger 10 may be able to decode the display code 8 and find out information about the customer. If the customer prefers anonymity, then when the Logger 10 reads the display code, no information regarding the customer is provided to the establishment and only the Service server 6 can determine who the customer is.

The condition used to trigger sending the notification of the status information may be pre-programmed into the Logger application so as to be automated. For example, the user may request to be notified when he is within a certain time of being serviced, when there are a certain number of people in front of him, every time his position in line changes, at predetermined intervals (e.g. every 5 minutes), and the like, or any combination thereof. These conditions can be established by the user through the activator application 2. In addition, a notification may be sent at any time by manually requesting the notification be sent by the establishment. Furthermore, the Logger 10 may notify customers in any order on the list or all at the same time utilizing the individual accounts of each customer. This would apply for group venues or curtain calls at events.

In addition to being notified of a ready table, the Logger 10 may transmit other status information in advance of the ready table, such as menu information, or time estimates for a table, specials for the day, and the like. Or the Logger 10 could provide options, such as notifying the user that an inside table is available now, or the user may wait for an outside table, perhaps with a time estimate for the outside table. Thus, the status information can be any information that will assist the user in making a decision as to whether he will continue to wait for the establishment or cancel his place in line. The advantage is the user no longer has to wait at the establishment until his turn is called.

In some embodiments, the Logger 10 may provide the user with response options. The user's response may be sent through the Activator application 2, the phone system, Bluetooth, Wi-Fi, the Internet, email, or any other suitable transmission method, such as those discussed above or any combination thereof, back to the Service server 6 or other server, which communicates with the Logger 10. Such response options could be to cancel his place in line, wait for the outside table (from the above example), to order a drink while waiting for a table, to make menu selections in advance of being seated, to inquire about nutritional information, or a variety of other information the user may want to provide or request.

Optionally, the user, after being notified that his table is ready, may cancel or ask to be placed later in the list, as a delay. Once again, this is done by the Activator application 2, which provides options for the user to choose from, and upon receiving the information from the user, the Activator application 2 sends the information to the Service server 6, which then communicates that information back to the Logger 10. The transmission of the signal from the Activator application 2 to the Service server 6, and from the Service server 6 to the Logger 10, is performed by one of the technologies discussed above, or a combination thereof.

Optionally, a user may log into the Service server 6 and print out the display codes 8. The user may use this option with a computer, or a standard cell phone, using phone message, or text message. To initiate the process, the printout is used at the Logger 10.

In some embodiments, the system may allow the user to get on multiple lists at the same time. Say there are three crowded restaurants right next to each other, and the user has a very hungry family, and just wants to eat as soon as he can. He puts himself on a list at each restaurant using the techniques described above. Therefore, he may have 3 display codes associated with his account, one for each restaurant, or he may use a common display code for all three. When the first restaurant notifies him that his table is ready, he can cancel the other two through the Activator application 2, either immediately, or when their status notifications come through. That would eliminate having to return multiple pagers to the non-selected restaurants. As another example of this feature, if the user needed help at two different businesses, such as the DMV and a very crowded deli counter with a long wait, he could put in requests at both, and then go the first one that has an opening as indicated by the Service server. Hopefully, the user could finish with one task before he got notification that he was at the top of the queue in the other establishment, but if not, the activator application 6 allows him to delay his progression in the other line, or cancel altogether.

In the preferred embodiment, a single display code 8 may be used by a customer at different establishments. In such a situation, each establishment may have a unique identifier. Therefore, when a communication is sent to the Service server 6, the display code 8 and the unique identifier is sent together so that the Service server 6 can identify the customer (via the display code) and the establishment (via the unique identifier). The Service server 6 can then relay the communication to the customer in a manner that would allow the customer to know which establishment was sending the communication.

The Activator application 2 may be programmed to give the user immediate control over information dissemination. The person using the Activator application 2 has the ability to give any combination of general information to the Logger 10 or remain anonymous. The information is returned either from the Service server 6 or coded as specified by the Activator application 2.

Another option may allow users to use the Activator 2 and Logger 10 for anonymous surveys. For example, the restaurant may want to offer a guest the opportunity to do an anonymous survey of the restaurant, either in real time or after the fact. The Logger 10 or an attached system could store the display code information or its equivalent, and send a message to the user's communication device offering the opportunity to participate in the survey.

Figure 2:
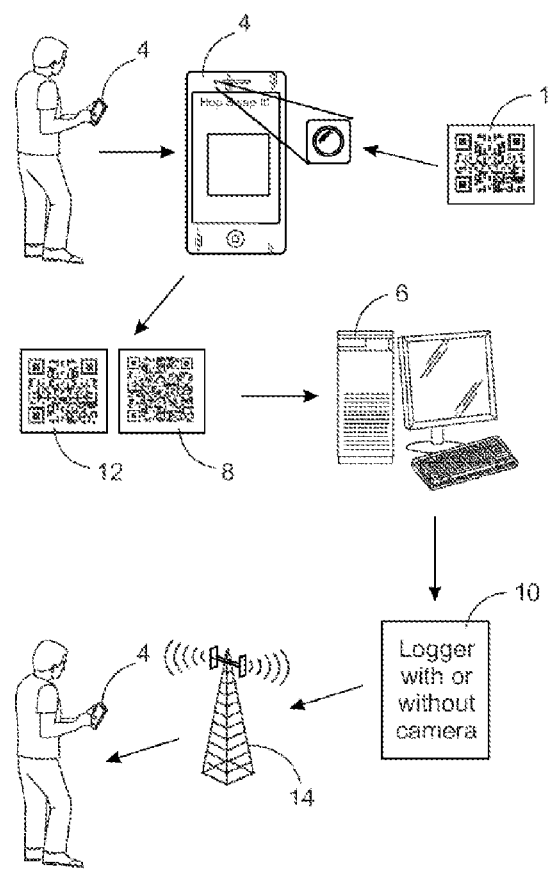
FIG. 2 depicts the hardware and steps to use an alternative embodiment of the present invention.

In an alternative embodiment, the display code 8 could also be used in reverse. For example, as shown in FIG. 2, the restaurant could have a unique Logger display code 12 that is associated with its Logger 10. In some embodiments, the Logger 10 generates the Logger display codes 12. As discussed above, the Logger display code 12 could be a 2-dimensional image, or some kind of RF or other transmission that could be received by the communication device 4. The user may photograph, scan, or otherwise read the Logger display code 12 with his smart phone. The Activator application 2 in the phone then interprets that Logger display code 12 and has the phone send a signal to the Service server 6, which may comprise both the Logger display code 12 and the user display code 8 or related information. Then the Service server 6 communicates with the Logger 10, which may show simple information such as "Bob, party of two, non-smoking," which the Service server 6 sends to the user. The Logger 10 can then communicate with the user, and vice-versa, by the methods described above.

Figure 5:
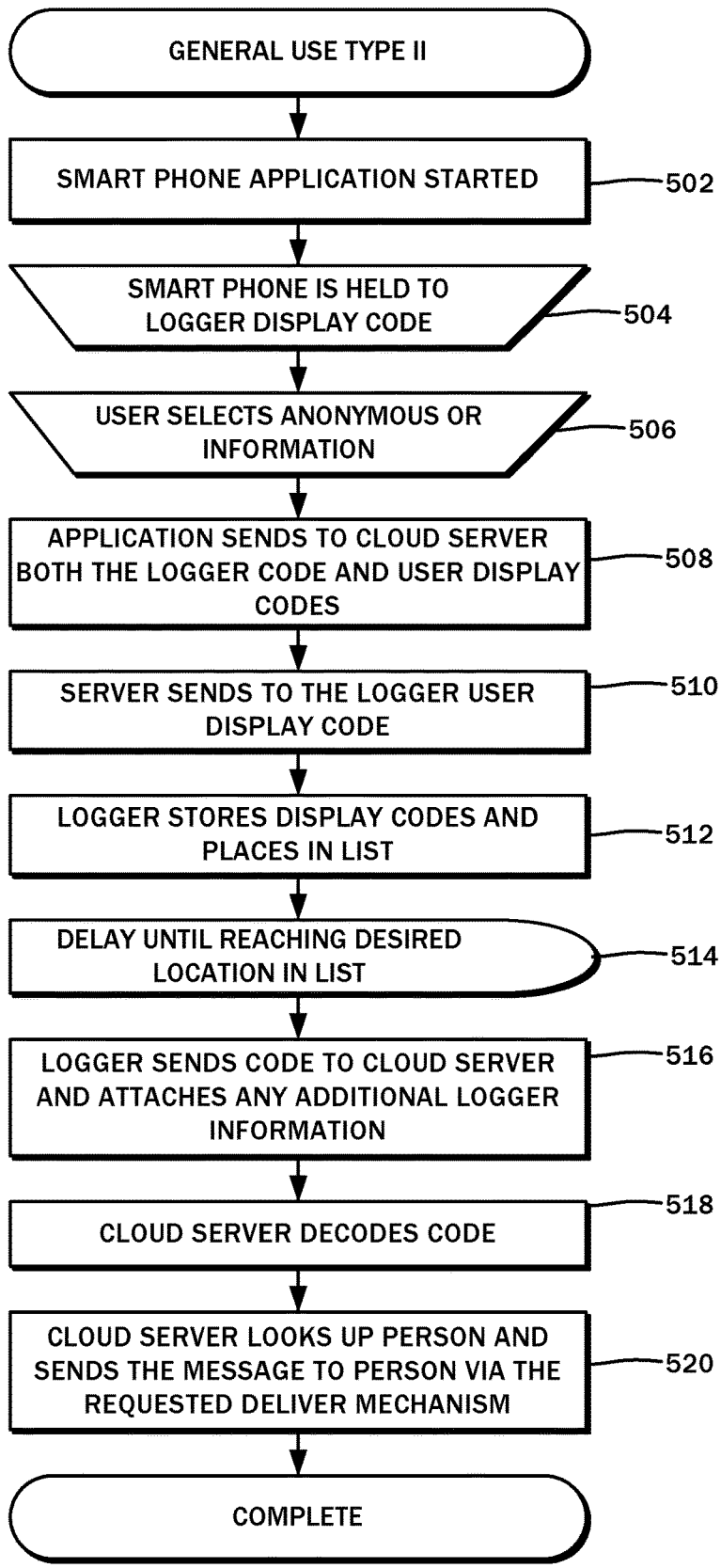
FIG. 5 depicts a flowchart of the steps of an alternative embodiment of the present invention.

FIG. 5 depicts a flow chart for the above example. The Activator application is started 500, the user's communication device receives the Logger display code 504, the user selects the information to disclose to the business 506, and the application sends the Logger display code and the user display code (or the associated information) to the Service server 508. The Service server uses the information to find both the Logger account and the user account, and then communicates the information to the Logger, which places the user in the waiting list 512. When the user reaches the desired location in the list 514, the Logger sends the user's display code information and the Logger information (e.g. status information) to the Service server 516. The Service server 6 correlates the user's display code information to the user's account 518, and using the information in the account, sends a signal to the user 520 via the user's selected delivery mechanism, transmitting the Logger information to the user.

Figure 6:
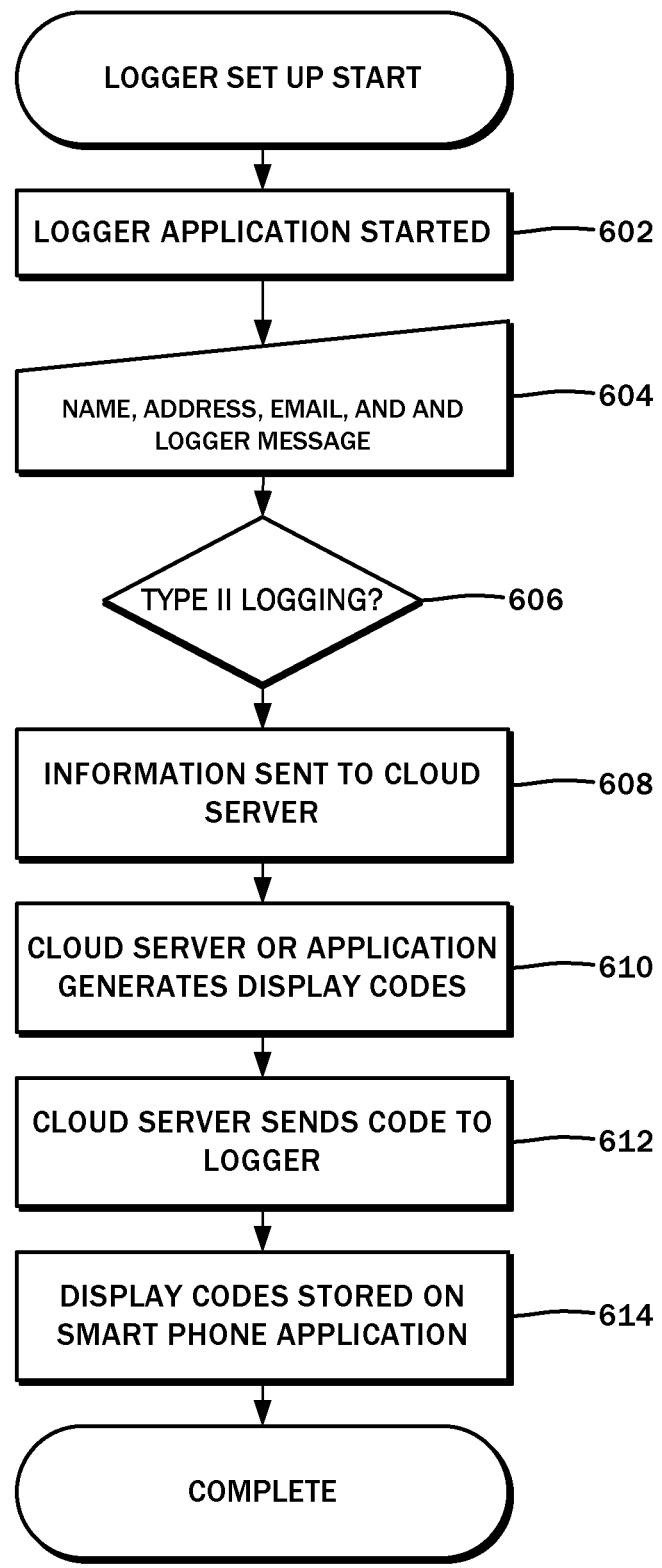
FIG. 6 depicts a flowchart of the logger set up steps of an embodiment of the present invention.

FIG. 6 depicts a flowchart of a typical Logger 10 set up. The Logger application is started 602 on the Logger device 10, and the Logger owner inputs the necessary information 604, such as name of the business, address, email, and perhaps the default information to send to users, which is sent to the Service server to create a Logger account for the Logger owner. The logger may be queried 606 as to which format he would be using (Logger display code 12 or user display code 8). This information is sent to the Service server 608. The Service server generates the proper logger display code 610, if applicable. The logger display code is sent to the logger 612. And the logger can display the display code at the logging site 614. Once this display code is scanned by a user that display code is entered into the queue and a new logger display code may generated and sent to the logger for the next user. Alternatively, the logging application may generate the logger display code and send it to the Service server.

If the Logger owner wants to use his own unique display code for the user to receive into his Activator application, then the Service server 6 may generate the Logger display code 12 and send it back to the Logger owner to print or display. Alternatively, the Service server 6 may send information to the Logger application to generate its own Logger display codes. A variety of Logger display codes might be generated, say for different nights of the week and different menu options. For example, if a restaurant has Taco Tuesday night, it might want to generate a Logger display code 12 to embed that information so that the Logger information sent to the user says "It's Taco Tuesday!" along with other relevant information such as drink specials, etc. Alternatively, the Logger's account might have that information, so when a user gets on a list, the Service server 6 may access the Logger account, and tailor the information sent to the user based on various criteria, such as time and date.

The preset disclosure has applications beyond just restaurants. It can be used in nearly any waiting list situation, whether for a hotel room, banks, delis, hair salons, amusement parks, or government agencies. It can also be used to simply and easily provide or exchange information between the user and a third party. For example, if the user wants to be put on an email list for a business, the user can choose to disclose that information on the Activator application and send that information to the Logger. Likewise, the business could return a wide variety of information to the user through the Activator application or by text, email, or push notifications, all using the technologies described above. As discussed above, the Service server can generate various display codes based on the privacy and notification settings established by the user.

Figure 8:
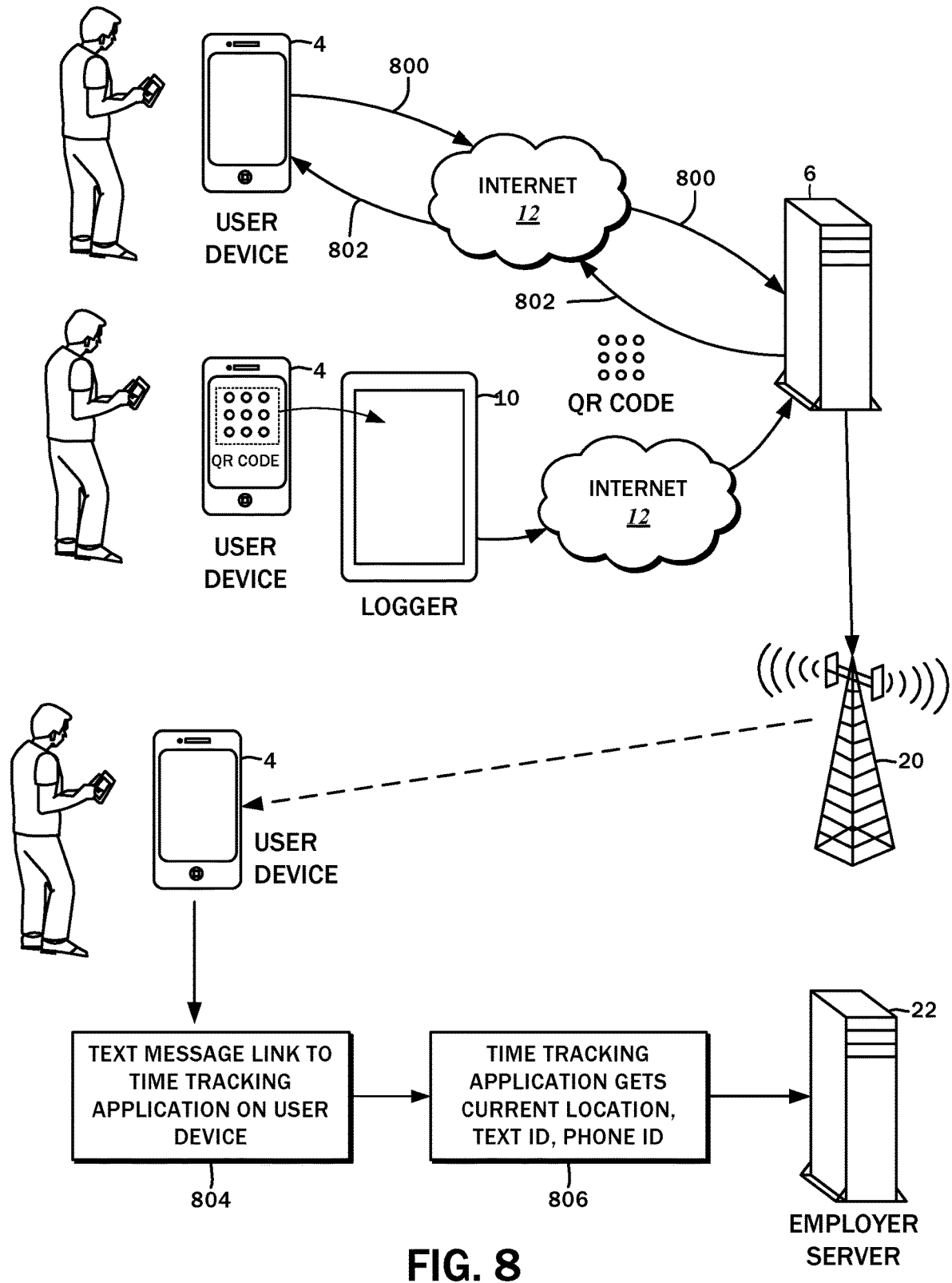
FIG. 8 depicts the hardware and steps to track working time of a user with a mobile device.
Figure 9:
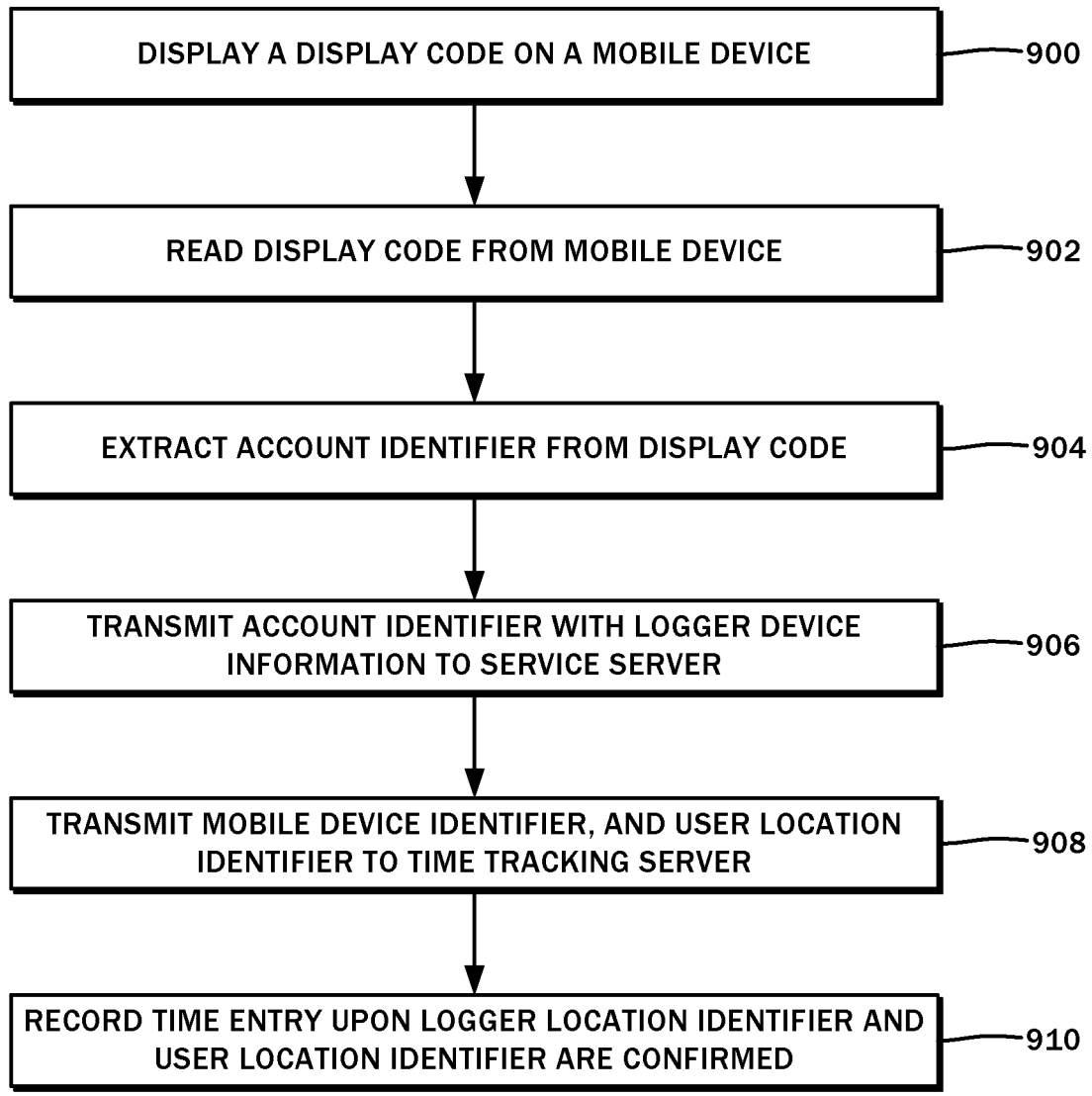
FIG. 9 depicts a flowchart of the steps of a method for tracking working time of a user.

With reference to the diagram of FIG. 8 and the flowchart of FIG. 9, another embodiment of the present disclosure contemplates a time card system by which the user of the communication device 4, also referred to herein as mobile device or a user mobile device, can be clocked in and clocked out with a location verification. Initially, the user creates an account via an application running on the communication device 4. The account may be defined in terms of one or more account record fields, and may include such information as name, address, city, state, zip code, phone number, cellular provider, e-mail address, and communications preference, along the same lines as the embodiments discussed above.

The data corresponding to these account record fields are input by the user via the communications device 4, and transmitted over a network 18 to the service server 6 in a transmission 800. This may take place in response to a trigger modality such as a button user interface element of the application that is activated by the user to generate an account creation request. With the transmitted data, the service server 6 creates the account, and generates an encrypted identifier associated therewith. This identifier may be encoded into a display code, which may be, for example, a Quick Response (QR) code. The display code may be any other suitable type, as indicated above. With the display code generated, the service server 6 transmits the same back to the communication device 4 in a transmission 802 over the network 18.

Subsequently, when the user/employee intends to clock in or clock out, the user invokes functionality implemented in the communication device 4 to display the display code for capture by the logger 10. Referring specifically to the flowchart of FIG. 9, this corresponds to a step 900 in the method for tracking working time with a mobile device/communications device 4 of the user.

The display code is then read by the logger in a step 902 in the manner discussed above, with the account identifier that is associated with the display code being extracted therefrom in a step 904. In addition to the display code, a facial recognition or like biometric authentication procedure may be utilized to capture an image of the face of the user, which serves as an additional authentication factor. Either a manual or automatic transmission of the account identifier to the service server 6 is initiated according to a step 906. The account identifier from the capture display code is accompanied by other information associated with the logger 10, including the phone/tablet identifier, logger location identifier as generated by an on-board GPS receiver, and so on. The service server 6 uses the received account identifier from the communications device 4 as encoded within the display code, and cross-references the account information stored on the service server 6 to initiate another transmission to the communications device 4 over an alternate modality 20. In one embodiment, this alternate modality is the short message service (SMS) of the cellular system. A text message 804 including a link to a time tracking application on the communications device 4 is then generated and sent to the communications device 4. Generally, this link is understood to be an application code that when selected, will start the time tracking application, passing parameter data that may have been pass through the text message.

The application retrieves the user location identifier from the on-board GPS receiver, and transmits the same together with a mobile device identifier to a time tracking server 22, also shown as the employer server. This corresponds to a step 908 of the method. It is understood that the transmission of the user location identifier and the mobile device identifier in response to the application invocation message, e.g., the text message 804.

In accordance with a step 910, a time entry associated with the user on is recorded on the time tracking server 22 when the location as reported by the logger 10 and the location as reported by the communications device 4 are in the same vicinity. In other words, this recordation takes place when the user location identifier is correlated with the aforementioned logger location identifier as being with a predefined distance. Where facial data accompanies the user location identifier, a further level of verification is possible, as pre-stored biometric data is compared against the biometric data that is captured by the logger 10 at the time the display code is presented and captured.

Figure 10:
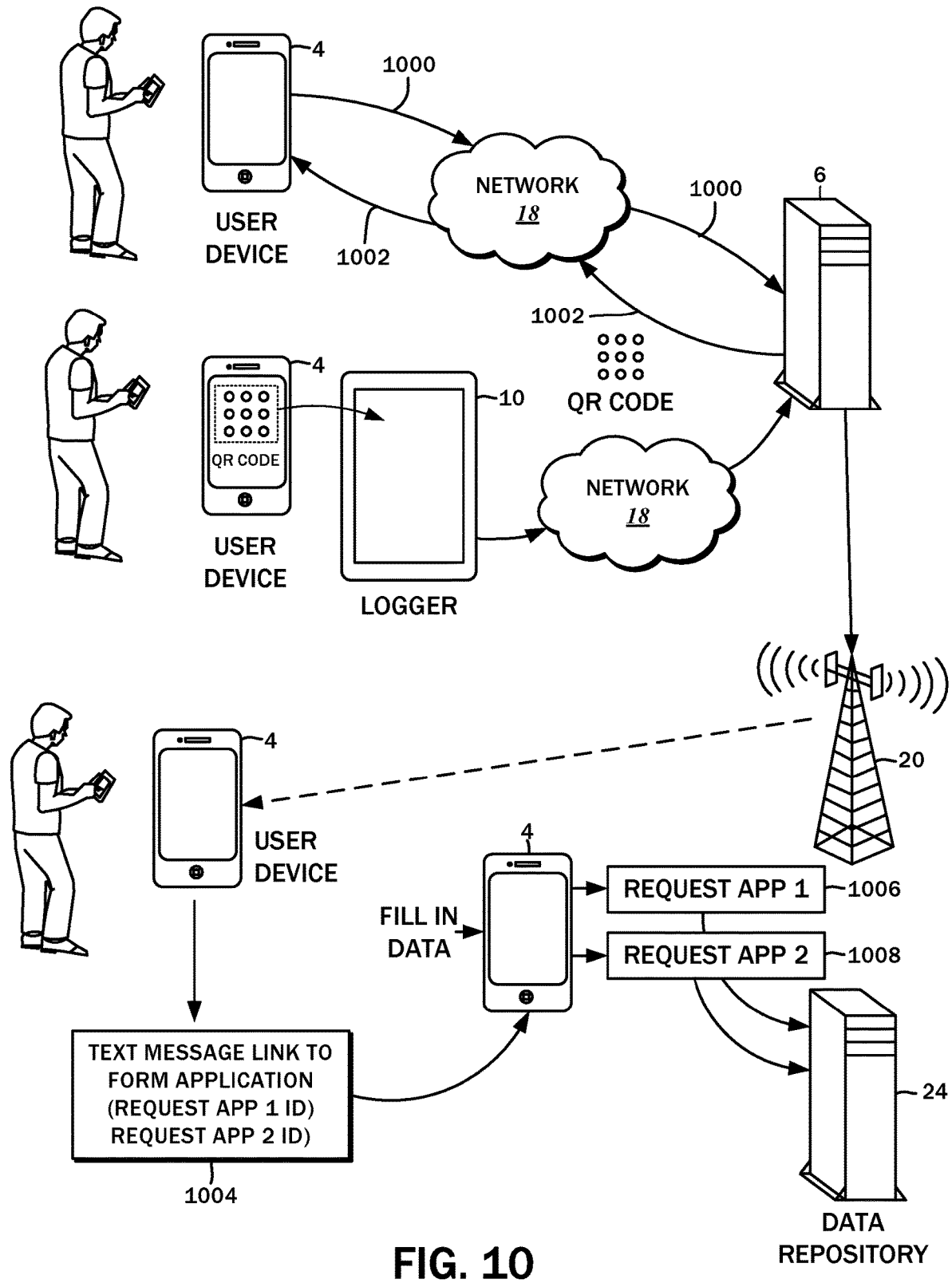
FIG. 10 depicts the hardware and steps to aggregating form data input to a mobile device of a user.
Figure 11:
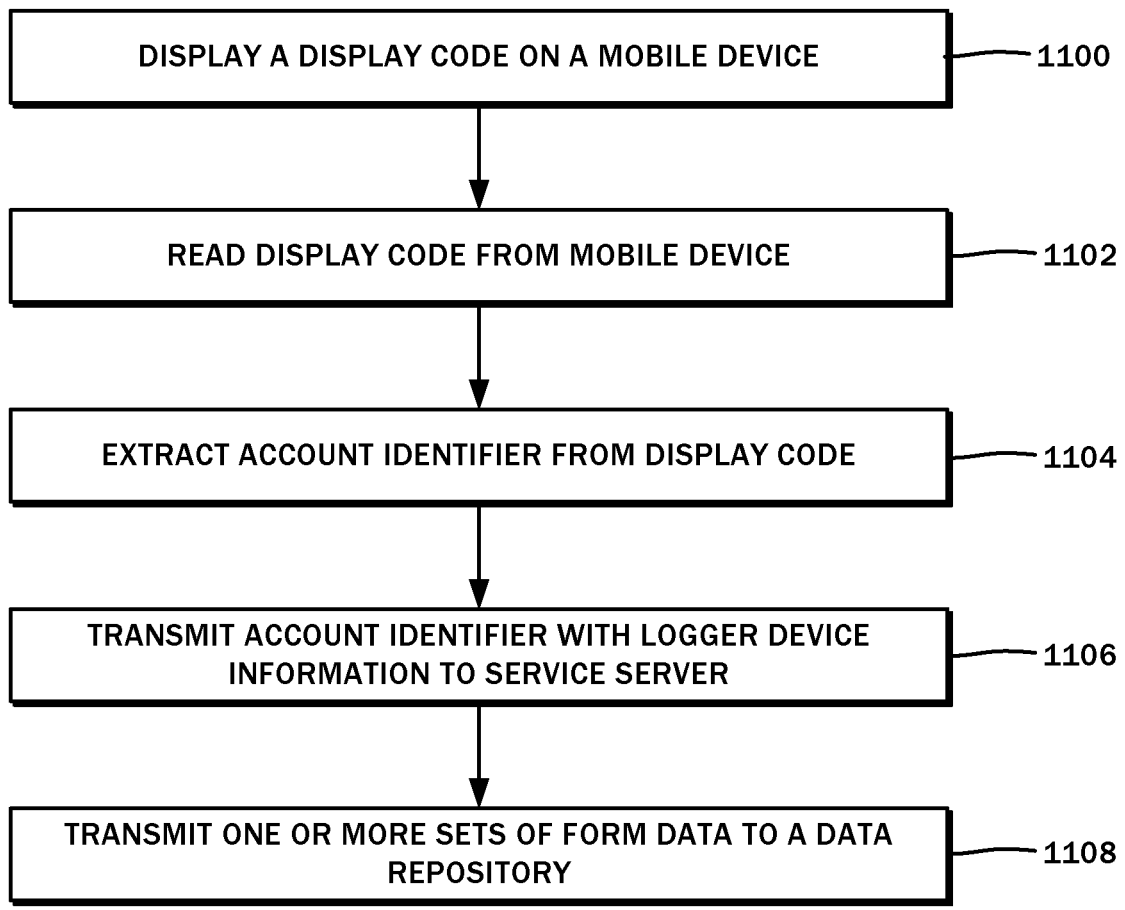
FIG. 11 depicts a flowchart of the steps of a method for aggregating form data input to a mobile device of a user.

Referring to the diagram of FIG. 10 and the flowchart of FIG. 11, another embodiment of the present disclosure contemplates the transferring of form data inputted into a communications device 14. One exemplary context in which this may be utilized is healthcare. Prior to admission, a hospital may require data provided to a self application (where name, home address, phone number, etc., are recorded), data provided to a health insurance application, as well as emergency contacts information. Other contexts again include employment, where an employer requires that an employee provide information from a self application, an employer application, a school alumni application, and a references application.

Again, the user initially creates an account via an application running on the communication device 4. The account may be defined in terms of one or more account record fields, and may include such information as name, address, city, state, zip code, phone number, cellular provider, e-mail address, and communications preference, along the same lines as the embodiments discussed above.

The data corresponding to these account record fields are input by the user via the communications device 4, and transmitted over the network 18 to the service server 6 in a transmission 1000. This may take place in response to a trigger modality such as a button user interface element of the application that is activated by the user to generate an account creation request. With the transmitted data, the service server 6 creates the account, and generates an encrypted identifier associated therewith. This identifier may be encoded into a display code, which may be, for example, a Quick Response (QR) code or any other suitable type code. With the display code generated, the service server 6 transmits the same back to the communication device 4 in a transmission 1002 over the network 18.

Subsequently, the user invokes functionality implemented in the communication device 4 to display the display code for capture by the logger 10. Referring specifically to the flowchart of FIG. 11, this corresponds to a step 1100 in the method for aggregating form data input to a mobile device of the user.

The display code is then read by the logger in a step 1102 as previously described, with the account identifier that is associated with the display code being extracted therefrom in a step 1104. Either a manual or automatic transmission of the account identifier to the service server 6 is initiated according to a step 1106. That is, the account identifier may be transmitted to the service server 6 in response to user input, or without any user intervention. The account identifier from the capture display code is accompanied by other information associated with the logger 10, including the phone/tablet identifiers and so on. The service server 6 uses the received account identifier from the communications device 4 as encoded within the display code, and cross-references the account information stored on the service server 6 to initiate another transmission to the communications device 4 over an alternate modality 20, which may be the short message service (SMS) of the cellular system. A text message 1004 including module codes associated with specific applications installed on the communications device 4 are then generated and sent to the communications device 4. In the illustrated example, the mobile communications device 4 may have installed thereon a first application 1006 that may be the aforementioned self application through which basic personal information such as name, home address, and the like are entered. The module code is thus understood to be a link to invoke the first application 1006. The mobile communications device 4 may have installed thereon a second application 1008 that may be the health insurance application through which insurance group identifier, employer name, and so on may be entered. Similarly, a second module code is understood to be a link to invoke the second application 1008.

The user will be requested to enter the data, and upon completion, the consolidated information may be transmitted to a data repository 24, also referred to as an aggregate database, in accordance with a step 1108. Thus, in accordance with this method, it is possible to transfer data from various data input applications on the communications device 4 to reduce the amount of manual typewritten input when filling out forms. It is contemplated that an event triggered through a text message and initiated by a display code displayed on the communications device 4 results in these disparate applications being called, with the data entered therein being consolidated with the data repository 24.

In various embodiments, the method steps described herein may be performed in an order different from the particular order described or shown. In other embodiments, other steps may be provided, or steps may be eliminated, from the described methods.

Systems, apparatus, and methods described herein may be implemented using digital circuitry, or using one or more computers using well known computer processors, memory units, storage devices, computer software, and other components. Typically, a computer includes a processor for executing instructions and one or more memories for storing instructions and data. A computer may also include, or be coupled to, one or more storage devices, such as one or more magnetic disks, internal hard disks and removable disks, optical disks, etc.

Systems, apparatus, and methods described herein may be used within a network-based cloud computing system. In such a network-based cloud computing system, a server or another processor that is connected to a network communicates with one or more client computers (e.g. customer's communication device and establishment's logger) via a network. For example, a client computer may communicate with the server via a network browser application residing and operating on the client computer. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein. Certain steps of the methods described herein, including one or more of the steps of FIGS. 3-6, 9, and 11, may be performed by a server or by another processor in a network-based cloud-computing system. Certain steps of the methods described herein, including one or more of the steps of FIGS. 3-6, 9, and 11 may be performed by a client computer in a network-based cloud computing system. The steps of the methods described herein, including one or more of the steps of FIGS. 3-6, 9, and 11 may be performed by a server and/or by a client computer in a network-based cloud computing system, in any combination.

Figure 12:
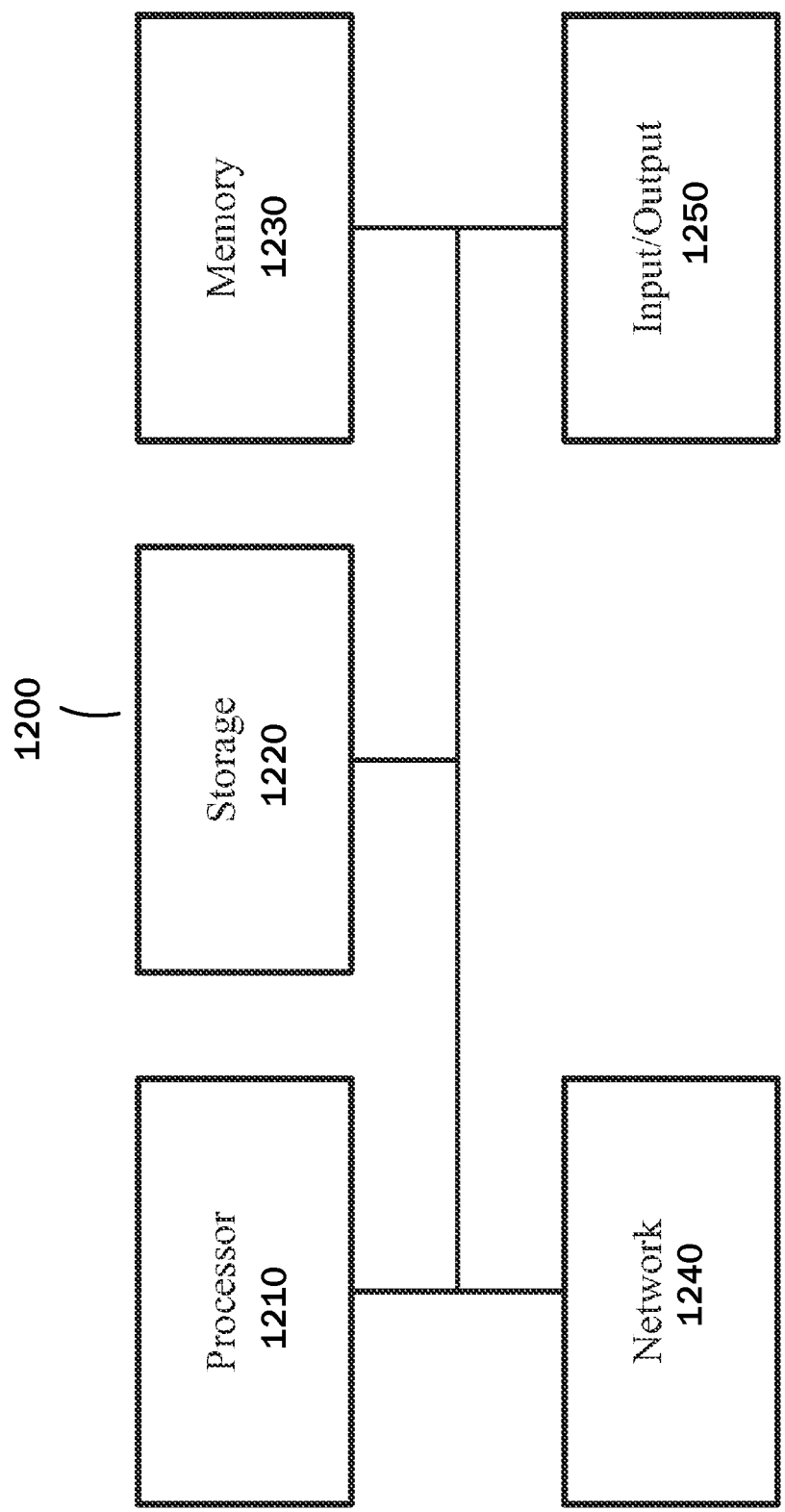
FIG. 12 shows a high level block diagram of an embodiment of the computer architecture to implement the present invention.

A high-level block diagram of an exemplary computer 1200 that may be used to implement systems, apparatus, and methods described herein is illustrated in FIG. 12. The computer 1200 comprises a processor 1210 operatively coupled to a data storage device and memory. Processor 1210 controls the overall operation of computer 1200 by executing computer program instructions that define such operations. The computer program instructions may be stored in data storage device 1220, or other non-transitory computer readable medium, and loaded into memory 1230 when execution of the computer program instructions is desired. Thus, the method steps of FIGS. 3-6, 9, and 11 can be defined by the computer program instructions stored in memory 1230 and/or data storage device 1220 and controlled by processor 1210 executing the computer program instructions.

For example, the computer program instructions can be implemented as computer executable code programmed by one skilled in the art to perform an algorithm defined by the method steps in FIGS. 3-6, 9, and 11. Computer 1200 also includes one or more network interfaces 1240 for communicating with other devices via a network. Computer 1200 also includes one or more input/output devices 1250 that enable user interaction with computer 1200 (e.g., display, keyboard, touchpad, mouse, speakers, buttons, cameras, scanners, etc.).

Processor 1210 can include, among others, special purpose processors with software instructions incorporated in the processor design and general purpose processors with instructions in storage device 1220 or memory 1230, to control the processor 1210, and may be the sole processor or one of multiple processors of computer 1200. Processor 810 may be a self-contained computing system, containing multiple cores or processors, a bus, memory controller, cache, etc. A multi-core processor may be symmetric or asymmetric. Processor 1210, data storage device 1220, and/or memory 1230 may include, be supplemented by, or incorporated in, one or more application-specific integrated circuits (ASICs) and/or one or more field programmable gate arrays (FPGAs). It can be appreciated that the disclosure may operate on a computer 1200 with one or more processors 810 or on a group or cluster of computers networked together to provide greater processing capability.

Data storage device 1220 and memory 1230 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Network/communication interface 1240 enables the computer 1200 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Token Ring, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 840 enables the computer 1200 to transfer data, synchronize information, update software, or any other suitable operation.

Input/output devices 1250 may include peripherals, such as a printer, scanner, camera, monitor, etc. Input/output devices 1250 may also include parts of a computing device, such as a smartphone having a touchscreen, speakers, and buttons. For example, input/output devices 1250 may include a display device such as a liquid crystal display (LCD) monitor for displaying information to the user, a keyboard and mouse by which the user can provide input to the computer 1200, or a touchscreen for both input and output.

Any or all of the systems and apparatus discussed herein, including personal computers, tablet computers, hand-held devices, cellular telephones, servers, database, cloud-computing environments, and components thereof, may be implemented using a computer such as computer 1200.

One skilled in the art will recognize that an implementation of an actual computer or computer system may have other structures and may contain other components as well, and that FIG. 12 is a high level representation of some of the components of such a computer for illustrative purposes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A notification system, comprising a cloud-based service server configured to:

a. generate a plurality of display codes associated with a user, each display code associated with different types of information regarding the user;
b. send the plurality of display codes to a communication device for the user to select;
c. receive a communication from a logger associated with an establishment, the communication from the logger being transmitted upon reading a selected one of the display codes on the communication device of the user therewith, an association between the user and the display code being made exclusively on the cloud-based service server with the user maintaining anonymity with respect to the establishment;
d. storing a representation of the display code in a queue, wherein the queue has additions, shifts, and removals of the representations of the display code and other display codes;
e. relay the communication received from the logger to the communication device of the user based and its status relative to the queue upon the association on the cloud-based service server between the user and the display code;
f. receive, from the logger, updated information associated with the selected display code in response to an independent action on the logger pertaining to the selected display code; and
g. relay the updated information received from the logger to the communication device of the user based upon the association on the cloud-based service server between the user and the display code.

2. The notification system of claim 1, wherein the plurality of display codes are generated when requested by the user.

3. The notification system of claim 2, wherein the plurality of display codes are sent to the user to be displayed on a communication device of the user.

4. The notification system of claim 3, wherein the plurality of display codes are associated with the user's identifying information and a mode of delivery of how the user wants to be notified.

5. The notification system of claim 3, wherein the plurality of display codes are generated with different privacy settings and notification options.

6. The notification system of claim 3, wherein the updated information is sent to the communication device of the user based on a mode of delivery selected by the user, wherein the mode of delivery is selected from the group consisting of an email, a text message, and a push notification.

7. The notification system of claim 1, wherein the selected display code is printed as a hardcopy.

8. The notification system of claim 1, wherein the plurality of display codes are generated for one user, wherein each display code is associated with a different establishment.

9. The notification system of claim 1, wherein the communication is a status of the user in a list.

10. A notification method, comprising the steps of:
a. receiving at a service server, information from a user via a communication device;
b. creating a user account for the user on the service server, the user account containing information regarding a desired mode of communication;
c. the service server generating a plurality of display codes associated with the user for selection and display on the communication device, the association between the user and the plurality of display codes being defined exclusively on the service server, wherein when a selected display code is read by at least one logger from at least one establishment, a representation of the selected display code being stored in a queue, wherein the queue has additions, shifts, and removals of representations of the selected display code and other display codes, the representation of the selected display code being stored without associating the user to the display code on the at least one logger of the at least one establishment;
d. the service server receiving status information from the at least one logger of the establishment associated with the selected display code and its status relative to the queue; and
e. the service server relaying the status information to the communication device via the desired mode of communication based upon matching the association between the selected display code and the user, and the service server providing a plurality of response options for the communication device.

11. The notification method of claim 10, further comprising the user notifying a plurality of establishments of the response via the service server and the logger.

12. The notification method of claim 10, wherein the plurality of display codes are generated when requested by the user.

13. The notification method of claim 10, wherein the plurality of display codes are associated with identifying information of the user.

14. The notification method of claim 10, wherein the plurality of display codes are generated with different privacy settings and notification options.

15. The notification method of claim 10, wherein the selected display code is printed as a hardcopy.

16. The notification method of claim 10, wherein plurality of display codes are generated for one user, wherein each display code is associated with one of the plurality of establishments.

17. A method for managing notifications to one or more user communication devices, the method comprising:
creating a user account for a user on a service server, the user account including a notification delivery mode received from the user;
transmitting, from the service server to the user communication device, a plurality of display codes associated with the user as generated by the service server and stored in an image repository, the display codes being associated with a specific set of information for the user;
reading, by a plurality of loggers each associated with one of a plurality of competing establishments, a display code displayed on the user communication device as selected by the user;
placing a representation associated with the display code on in a queue that has additions, shifts, and removals of representations associated with the display code and other display codes and each corresponding to a given one of the plurality of loggers, the representation being linked solely to an identifier of the display code on the service server without any additional information for the user being provided to the loggers to maintain anonymity;
receiving, on the service server, status information of the queue as relating to the representation of the display code;
relaying, from the service server to the user communication device over the notification delivery mode, the status information for the representation of the display code and accompanied by a plurality of response options for the user communication device;

receiving, from the user communication device, a selection of one of the plurality of response options for a designated one of the loggers; and transmitting a response from the service server to the designated one of the loggers.

\* \* \* \* \*